United States Patent [19]

Harrigill

[11] Patent Number: 4,779,676
[45] Date of Patent: Oct. 25, 1988

[54] CONDENSING FURNACE
[75] Inventor: William T. Harrigill, Wichita, Kans.
[73] Assignee: The Coleman Company, Inc., Wichita, Kans.
[21] Appl. No.: 870,970
[22] Filed: Jun. 5, 1986

Related U.S. Application Data
[62] Division of Ser. No. 331,167, Dec. 16, 1981, Pat. No. 4,730,600.

[51] Int. Cl.⁴ ............................ F24H 3/10; F28F 3/04
[52] U.S. Cl. ..................................... 165/170; 165/164; 126/108; 126/99 R
[58] Field of Search ................... 126/91 R, 99 R, 108, 126/117; 165/170, 164

[56] References Cited
U.S. PATENT DOCUMENTS 2,231,227  2/1941  Scott ..................................... 126/99
2,613,920  10/1952  Flint ................................. 126/91 R
3,593,783  7/1971  Muller et al. ..................... 165/164

Primary Examiner—Albert W. Davis, Jr.

[57] ABSTRACT

A compact, high efficiency condensing furnace includes a combustion chamber and a pair of radiators. The temperature of the combustion gases is reduced in one of the radiators to the point at which combustion products condense, thereby extracting the latent heat of vaporization from these combustion products. Each of the radiators has an inlet and an outlet and a baffle between the inlet and outlet to prevent combustion gases from passing directly from the inlet to the outlet. Additional turbulence-providing baffles can be provided within the radiators if desired. A combustion air inlet pipe extends through a recess in the bottom of each radiator to the combustion chamber, and a gas burner tube extends generally concentrically within the combustion air inlet pipe to provide a gas flame within the combustion chamber. A flame spreader plate directs the flame toward the bottom of the combustion chamber.

4 Claims, 5 Drawing Sheets

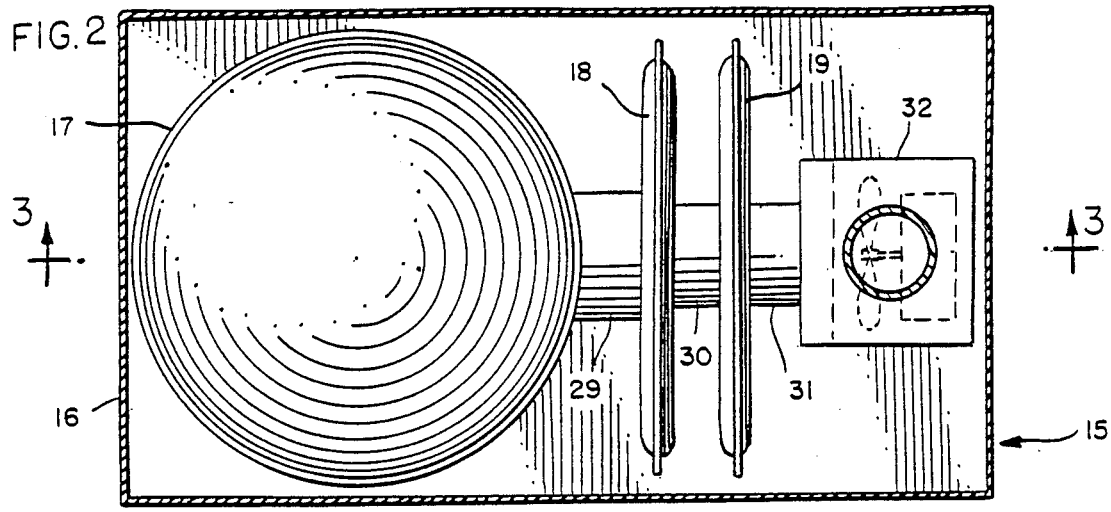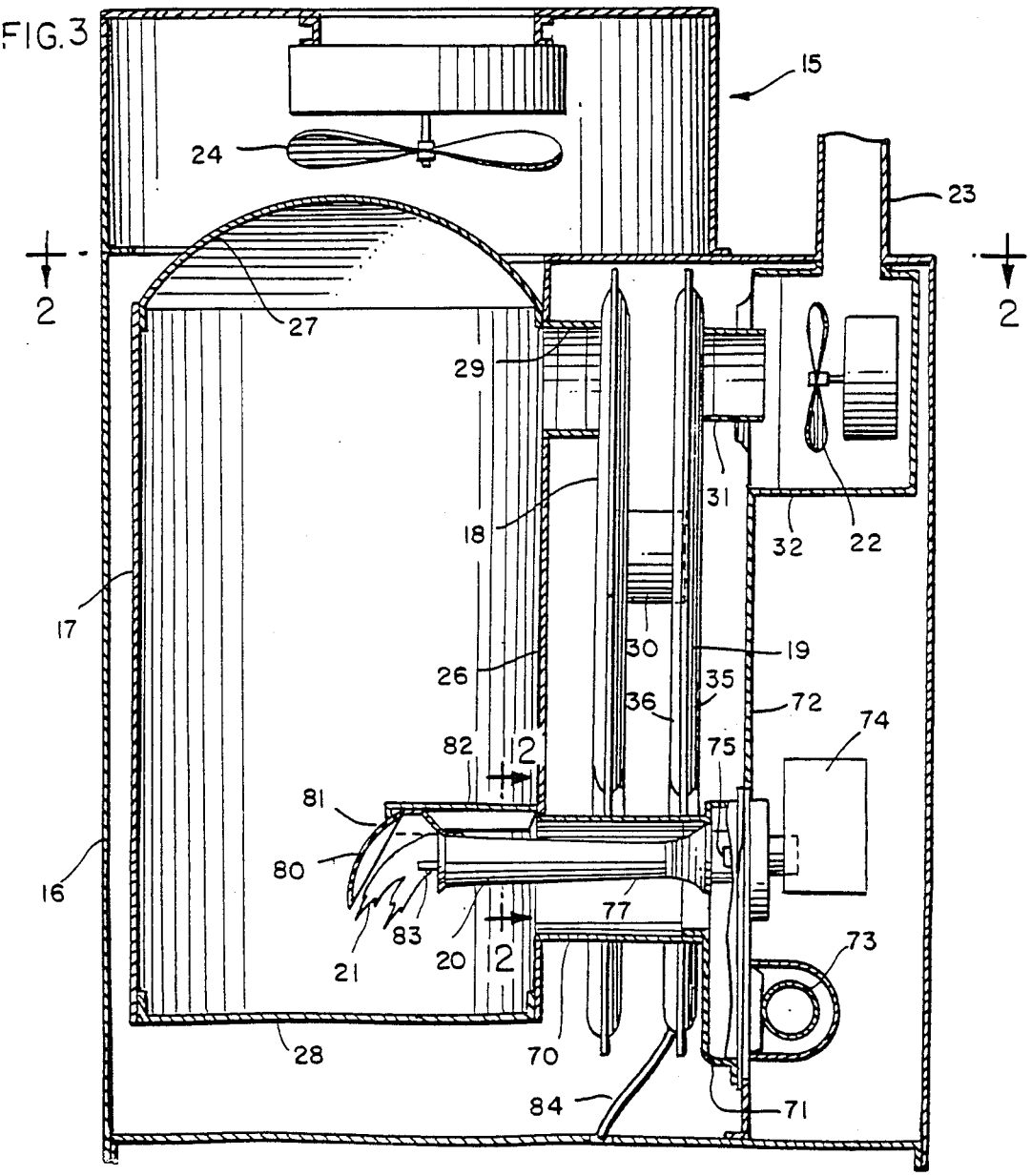

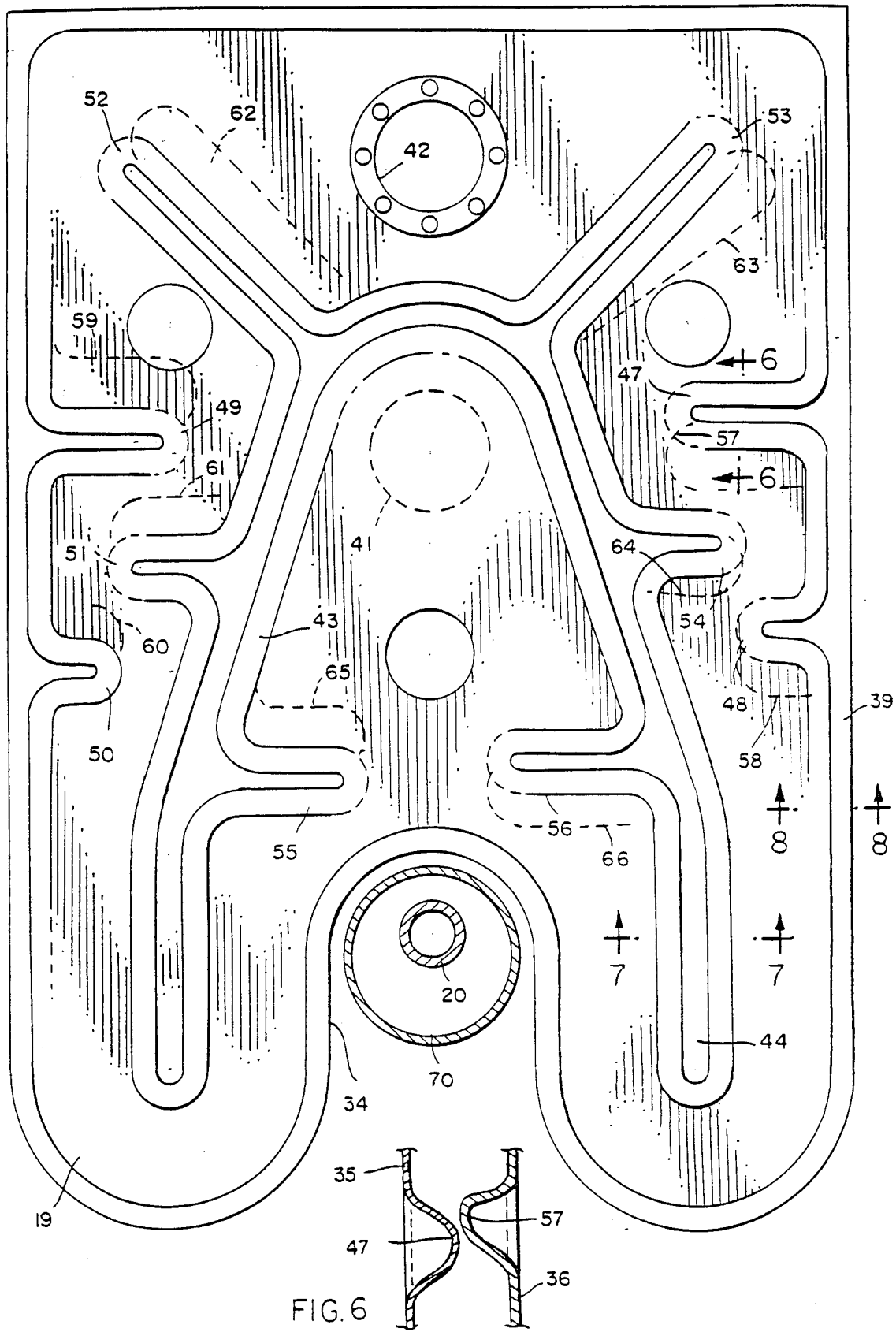

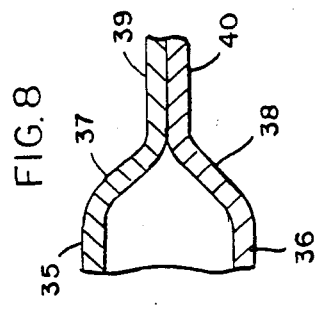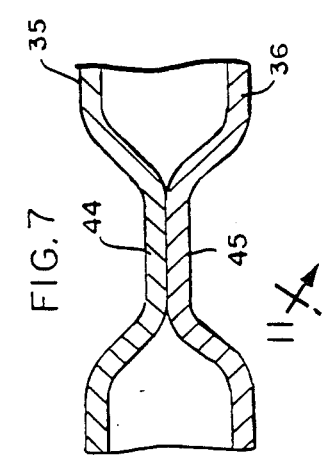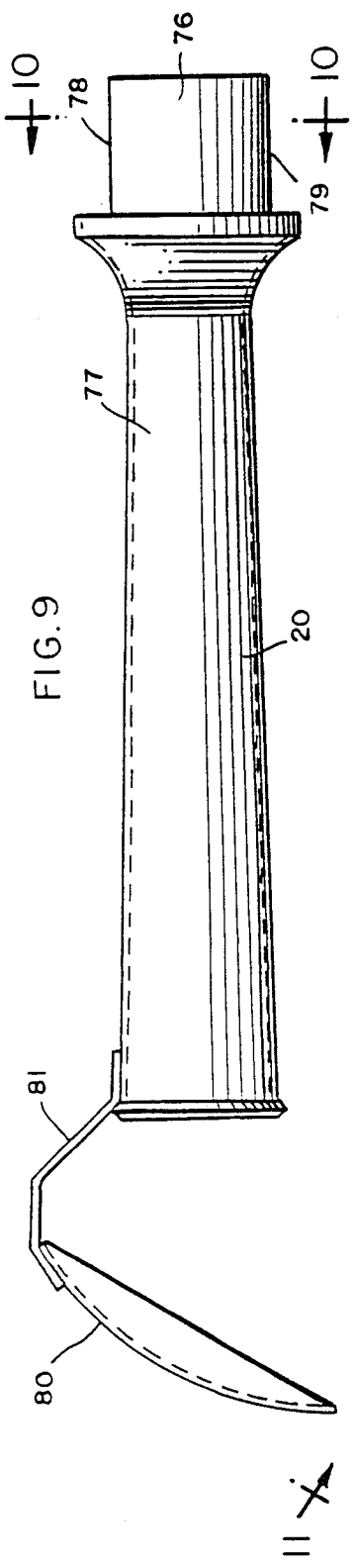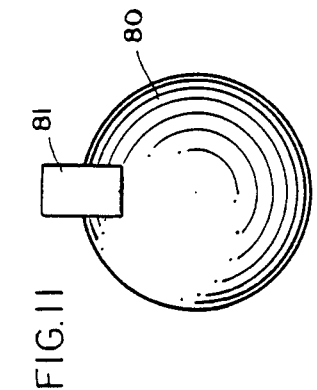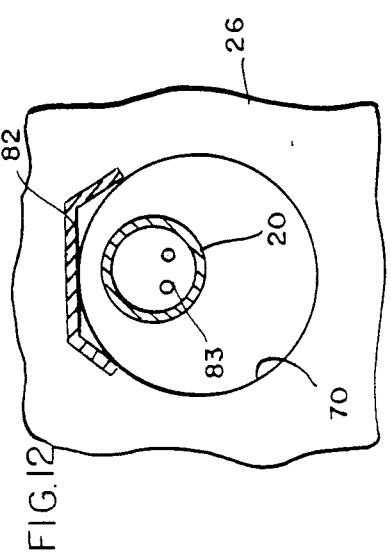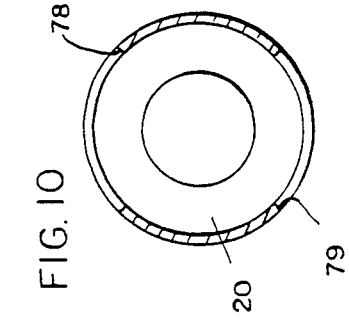

CONDENSING FURNACE

RELATED APPLICATION

This application is a division of U.S. patent application Ser. No. 331,167, filed Dec. 16, 1981, now U.S. Pat. No. 4,730,600 granted Mar. 15, 1988.

BACKGROUND

This invention relates to a condensing furnace, and, more particularly to a compact, high efficiency condensing furnace.

The increasing demand for energy efficient furnaces has caused a reevaluation of condensing furnaces. Condensing furnaces have been known for many years, but they have never enjoyed widespread acceptance. For example, U.S. Pat. Nos. 1,990,827 and 2,290,255 disclose furnaces in which hot combustion gases flow from a combustion chamber through a series of heat exchangers. In each of these furnaces the temperature of the combustion gases is progressively lowered in each heat exchanger, and condensation of combustion products may occur in one or more of the heat exchangers.

Condensation of combustion products releases the latent heat of vaporization, thereby providing additional heat to the room air which is circulated past the heat exchangers. However, the condensate is very corrosive and can cause problems if not properly handled.

Perhaps another reason why the old condensing furnaces never achieved widespread use was the bulkiness of such furnaces. The furnaces illustrated in said prior patents are large, bulky, and heavy.

A more recent type of condensing furnace is described in U.S. Pat. No. 4,261,326. Three clamshell heat exchangers are used. Gas burners are positioned within two of the heat exchangers, and the hot combustion gases are directed to the third heat exchanger, where some condensation of combustion products may occur.

SUMMARY OF THE INVENTION

The invention provides a condensing furnace which is compact, highly efficient, and which effectively handles condensed products of combustion.

Combustion gases flow from a generally cylindrical combustion chamber through a pair of clamshell radiators. Each of the radiators is provided with baffles which maximize the flow path within the radiator and which create turbulence in the flow of the gases. Condensation occurs within the second radiator, and this radiator is either provided with a corrosive-resistant inner coating or made of corrosion-resistant materials. The condensate passes through a drain in the bottom of the second radiator.

Each of the radiators is provided with a recess at the bottom, and a combustion air inlet pipe and a generally concentric gas burner tube extends through these recesses to the combustion chamber. A flame spreader plate at the end of the gas burner tube directs the flame toward the bottom of the combustion chamber. The combustion gas outlet and the combustion air inlet are both located on the same side of the furnace. Combustion air flow is enhanced by a motor driven draft inducer. Additional combustion air flow may be provided by a combustion air blower, which may be operated by the same motor as the inducer. Since the temperature of the flue gas is low, single walled vent piping with low temperature resistance characteristics may be used. The combustion air inlet pipe may be connected to the outside so that outside air is used for combustion air.

Room air is circulated past the radiators and the combustion chamber and creates a positive pressure on the outside of these components. This positive exterior pressure and the negative interior pressure created by the draft inducer protects against leaks of combustion gases.

DESCRIPTION OF THE DRAWING

The invention will be explained in conjunction with an illustrative embodiment shown in the accompanying drawing, in which—

FIG. 2 is a sectional view of the furnace taken along the line 2—2 of FIG. 3;

FIG. 3 is a sectional view of the furnace taken along the line 3—3 of FIG. 2;

FIG. 5 is a front elevational view of one of the radiators taken along the line 5—5 of FIG. 4;

FIG. 6 is a fragmentary sectional view of one of the draws of a radiator taken along the line 6—6 of FIG. 5;

FIG. 7 is a fragmentary sectional view of the baffle of one of the radiators taken along the line 7—7 of FIG. 5;

FIG. 8 is a fragmentary sectional taken along the line 8—8 of FIG. 5;

FIG. 9 is an enlarged side elevational view of the gas burner;

FIG. 10 is an end view of the gas burner taken along the line 10—10 of FIG. 9;

FIG. 11 is a view of the flame spreader plate taken along the line 11—11 of FIG. 9;

FIG. 12 is a fragmentary sectional view taken along the line 12—12 of FIG. 3.

DESCRIPTION OF SPECIFIC EMBODIMENTS

Figure 1:
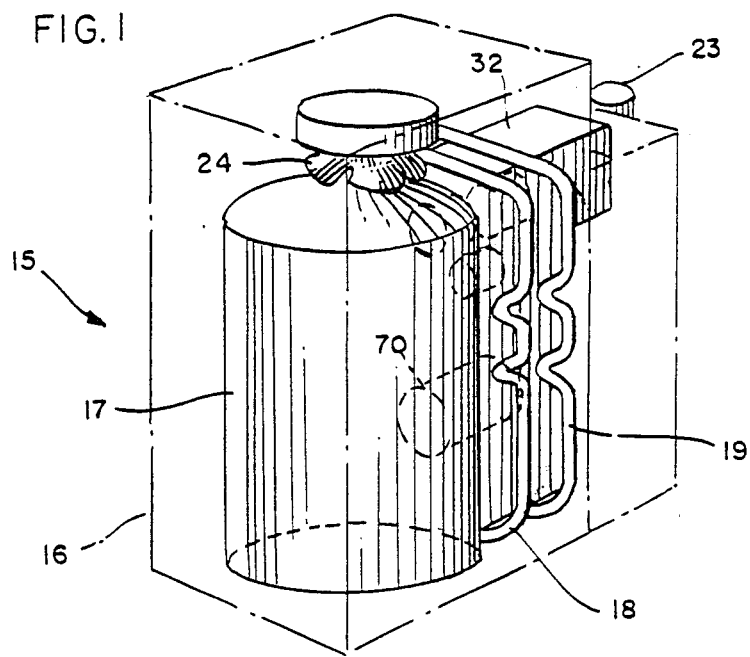
FIG. 1 is a perspective view, partially in phantom, of a condensing furnace formed in accordance with the invention.
Figure 4:
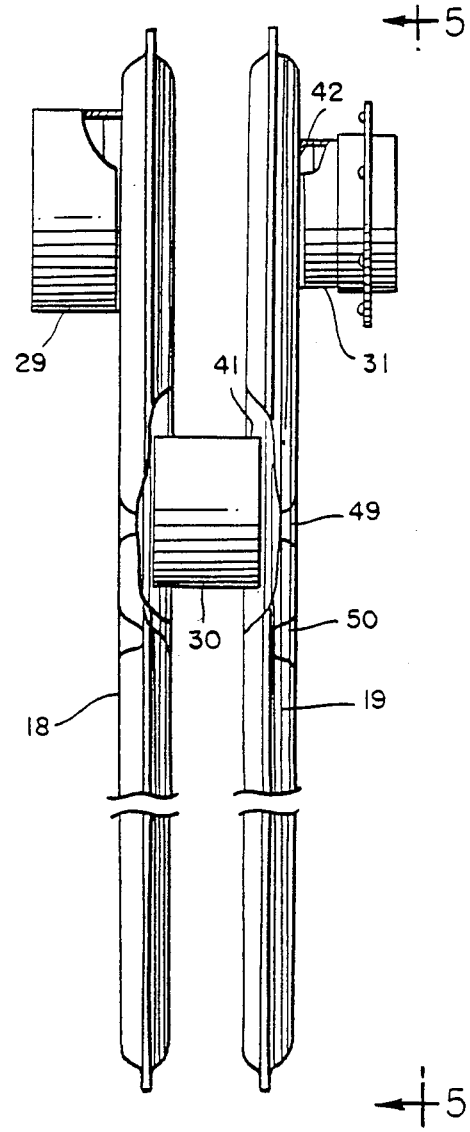
FIG. 4 is a side elevational view, partially broken away, of the radiators.
Figure 13:
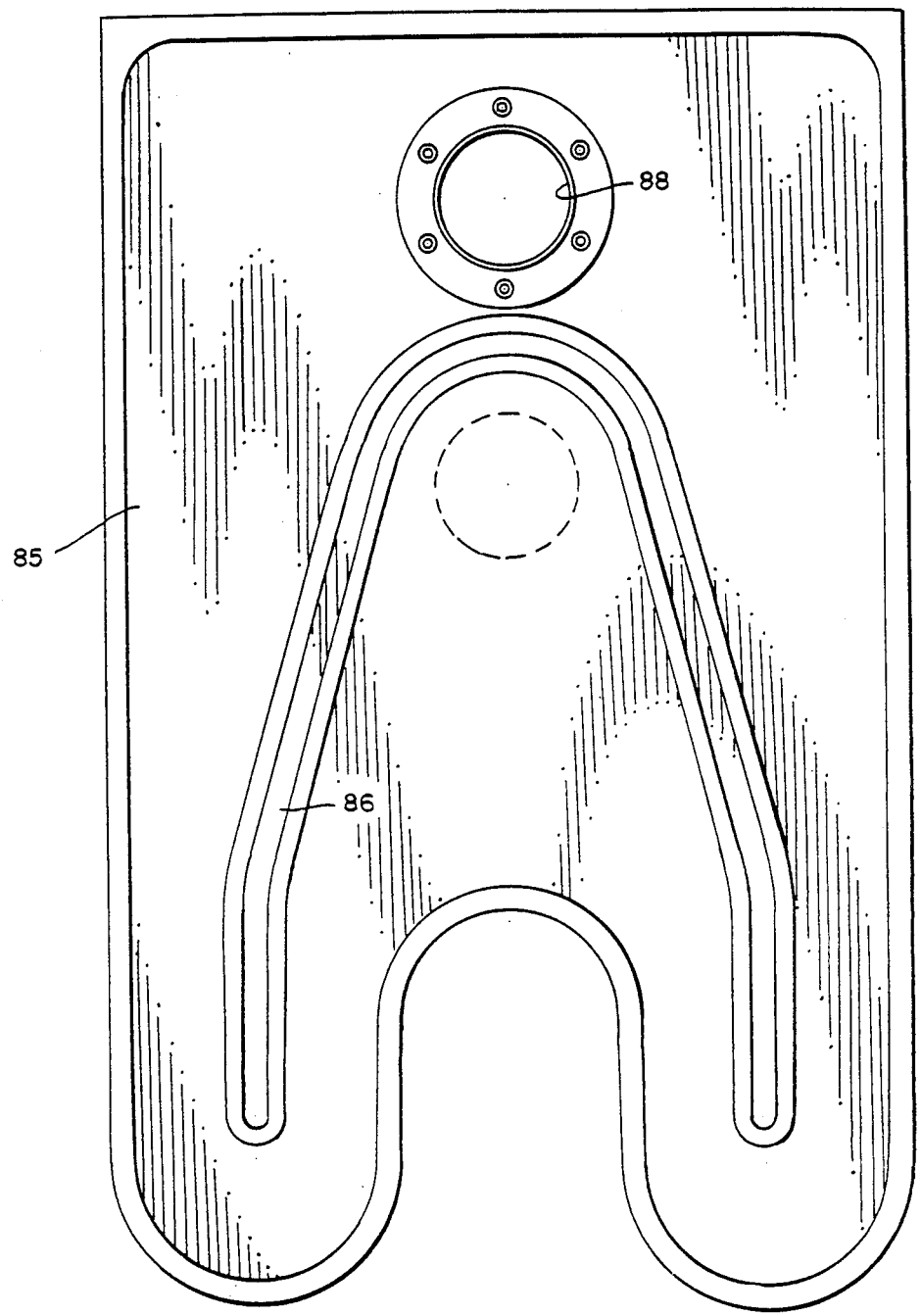
FIG. 13 is a view similar to FIG. 7 of a modified radiator.

Referring first to FIGS. 1-3, the numeral 15 designates generally a furnace which includes an outer casing 16, a generally cylindrical combustion chamber 17, and a pair of clamshell radiators 18 and 19. A gas burner 20 (FIG. 3) extends into the combustion chamber and provides a gas flame 21. Hot combustion gases are drawn through the combustion chamber 17 and radiators 18 and 19 by a draft inducer or blower 22. The combustion gases exit through a flue pipe 23. A circulating air blower 24 forces room air past the combustion chamber and radiators, heating the room air and delivering it to the rooms to be heated. The air is circulated from the rooms to the furnace through conventional delivery and return ducts.

The combustion chamber 17 includes a cylindrical side wall 26, a dome-shaped top wall 27, and a flat bottom wall 28. A connector pipe 29 connects the top of the combustion chamber to the top of the first clamshell radiator 18. The two radiators are connected by a connector pipe 30, and a pipe 31 connects the top of the second radiator 19 to a blower housing 32 in which the inducer 22 is located.

Referring now to FIGS. 5-7, each of the radiators 18 and 19 has a somewhat inverted U shape which is provided by an upwardly extending recess 34 at the bottom of the radiator. Each radiator is formed from a pair of metal sheets 35 and 36 which are drawn to form side walls 37 and 38 (FIG. 8) and mating peripheral flanges 39 and 40. The flanges are suitably secured together to form a gastight seal, as by spotwelding and gaswelding or by other appropriate means.

The gas inlet opening 41 is provided in the metal sheet 36, and the gas outlet opening 42 is formed in the metal sheet 35. The two openings are offset vertically, and a baffle 43 extends between the openings and prevents direct gas flow from the inlet to the outlet. The baffle has a general inverted U shape and is formed by inwardly extending draws or indentations 44 and 45 (FIG. 7) in the two metal sheets. The draws operatively contact each other along the U-shaped path to effectively block gas flow between the sheets along the baffle.

The baffle increases the length of the flow path of the combustion gases, thereby increasing the efficiency of the radiators. Combustion gases flow through the inlet opening 41 and are forced by the baffle to flow downwardly around the legs of the baffle and upwardly along the sides of the radiator before the gases can exit at the exhaust opening 42.

The particular radiator illustrated is provided with additional draws or indentations in each of the metal sheets to increase the turbulence of the gas flow. Side draws 47 and 48 (see also FIG. 6) extend laterally inwardly from one side of the metal sheet 35, side draws 49 and 50 extend laterally inwardly from the other side of the metal sheet 35, draws 51, 52, 53, and 54 extend outwardly from the baffle 43, and draws 55 and 56 extend inwardly from the baffle.

Corresponding turbulence-providing draws are formed in the other metal sheet 36 of the radiator adjacent to, but slightly offset from, the draws 47–56. For example, referring to FIG. 6, draw 57 is formed in the metal sheet 36 adjacent to the draw 47 in the sheet 35. The other draws 58–66 in the sheet 35 are shown in dotted outline in FIG. 5 adjacent to the corresponding draws 48–56 of the sheet 35. The non-symmetrical or offset relationship between the turbulence-providing draws of the two halves of the radiator increases the turbulence of the combustion gases and avoids the noises of thermal expansion which might occur if the draws were positioned opposite each other.

The radiator 18 is identical to the radiator 19, and the two radiators can be formed from the same tooling. However, the positions of the two radiators are reversed so that gas flows in the opposite direction through each radiator. In radiator 18 gas flows from the upper inlet opening down around the outside of the baffle to the legs of the radiator and then up to the lower outlet opening. In the radiator 19 gas flows downwardly from the lower inlet opening 41 inside of the baffle to the bottom of the legs of the heat exchanger and then upwardly outside of the baffle to the upper outlet opening 42.

Returning to FIG. 3, the burner tube 20 extends generally concentrically within a combustion air inlet tube 70. The combustion air inlet tube extends between the combustion chamber 17 and an air inlet housing 71 which is connected to a partition or wall 72 which is part of the furnace casing. An air inlet pipe 73 connects the air inlet housing 71 to the source of air for combustion which is preferably outside of the dwelling. The connections between the parts which form the path for combustion air are essentially airtight, and combustion air may be supplied entirely by outside, non-conditioned air. The draft for the combustion air can be provided either by the draft inducer 22 or by an optional combination of the draft inducer and a combustion air boost blower in the air inlet pipe 73. The optional push-pull arrangement permits a large BTU output to be achieved from a compact furnace and permits a full required range of BTU outputs to be achieved without the need for multiple casing and component sizes (with their attendant inventory and tooling costs). The optional combustion air boost blower may be powered by the same motor as the draft inducer 22.

A gas control valve 74 is mounted on a partition 72 and supplies gas to the burner tube 20 through a gas orifice 75. Referring to FIG. 9, the gas burner includes an inlet portion 76 which surrounds the gas orifice 75 and which is adjacent to a venturi portion 77. The cylindrical wall of the inlet portion 76 is provided with top and bottom open notches 78 and 79 shaped as segments of a cylinder (see also FIG. 10) through which primary combustion air is aspirated into the burner tube from the combustion air housing 71.

A flame spreader plate 80 is mounted on the flame end of the burner tube by a support bracket 81. The flame spreader is advantageously curved, and in one specific embodiment the flame spreader was a segment of a sphere having a radius of $3\frac{1}{2}$ inches and a chordal dimension across the segment of $3\frac{1}{2}$ inches. Secondary combustion air is directed along the top of the burner tube by a baffle 82 (FIG. 3) which is attached to the bracket 81.

The U shape of the radiators permits the combustion air inlet tube 70 and the burner 20 to extend from the combustion chamber to the front of the furnace on which the draft inducer is located. The gas control valve and the combustion air inlet are therefore positioned on the front of the furnace for convenient service and easy installation and to facilitate positioning in confined spaces. If the optional combustion air boost blower is used, this arrangement facilitates operation of it by the same motor which drives the draft inducer 22.

A pair of starter electrodes 83 (FIG. 3) extend through the burner tube and are operatively connected to the thermostatic control of the furnace, which also operates the gas valve 74. The furnace controls and gas valve can be conventional and need not be explained herein.

When the thermostatic controls calls for heat, the starter electrodes are energized. The gas control valve then opens, and gas is ignited at the flame end of the burner. The electrodes are then de-energized. The flame is deflected downwardly and laterally by the curved flame spreader plate 80 toward the bottom and side surfaces of the combustion chamber 17 so that the bottom 28 of the combustion chamber is heated without having flame impingement on the burner tube 20. The walls of the combustion chamber 17 are heated by both convection and radiation, and the combustion chamber 17 acts as a primary heat exchanger for heating room air which is circulated downwardly past the combustion chamber 17 by the circulating blower 24.

The hot combustion gases flow from the combustion chamber 17 to the first clamshell radiator 18, and the heat exchange between the first radiator and the circulating room air further lowers the temperature of the combustion gas. The temperature of the combustion gases is not lowered sufficiently in the first clamshell radiator 18 to cause condensation, and the material of the first clamshell radiator 18 does need to be specially protected against corrosion.

As the combustion gases flow through the second clamshell radiator 19, further heat exchange between the combustion gases and the circulating air occurs. The temperature of the combustion gases is lowered to the point where condensation of combustion products occurs, thereby releasing the latent heat of vaporization of these products. The temperature of the combustion gases will be reduced below their dew point in the second clamshell radiator. The material of the second clamshell radiator is advantageously stainless steel, but, because of the relatively low temperatures within the said second clamshell radiator, the interior of this heat exchanger can be provided with a corrosion-resistant inner coating such as teflon, epoxy or silicon. The condensate is drained from the second clamshell radiator by drain tubes 84 which extend from the bottom legs of the said radiator to a suitable disposal means. For example, a fast water flush of the effluent could be activated by the furnace controls.

The combustion gases are pulled from the second clamshell radiator by the draft inducer 22 and exit through the flue pipe 23. Since the temperature of the flue gas is low, single-walled vent piping with relatively poor high temperature tolerance characteristics such as plastic CPVC piping may be used for the flue pipe. The flue pipe can extend through any available partition to the outdoors.

The energy efficiency of the dwelling is further increased by providing combustion air from outside of the dwelling. This also eliminates the possibility that products of combustion which might be spilled from the furnace could reenter the furnace. Reentry of such products of combustion could upset the combustion process and cause malfunctioning of the furnace. Some furnaces are provided with a complex and costly sensor on the discharge side of the combustion inducer blower in order to safeguard against these occurrences. Such a sensor is unnessary with the sealed combustion air flow path described herein.

The draft inducer 22 creates a negative pressure within the combustion chamber and the radiators and the circulating air blower 24 creates a positive pressure on the outside of these components. As a result, any perforation or rupture in these parts will result in fresh room air entering into the combustion gas-containing system, and escape of combustion gas will be prevented. Although in the embodiment illustrated, the circulating air blower is positioned above the combusion chamber and radiators for a downflow configuration, the furnace can also be used in an upflow configuration. In an upflow configuration the combustion chamber would have a dome-shaped top and a flat bottom.

The turbulence-creating draws 47-66 in the radiators increase the turbulence of the flow of combustion gases through the radiators and increase the efficiency of the radiators. However, these draws can be omitted if desired. FIG. 12 illustrates a modified clamshell radiator 85 which is similar to the radiator 18 and 19 but which does not include these draws. The radiator 85 is similarly formed from a pair of metal halves which have an inverted U shape, and a U-shaped draw is formed in each half to provide a baffle 86 which extends between the inlet and outlet openings 87 and 88.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. A heat exhanger comprising a pair of spaced-apart generally flat walls which are connected around the peripheries thereof, one of the walls having an inlet opening in the flat portion thereof having an axis which extends generally perpendicularly to the plane of the flat portion and the other wall having an outlet opening in the first portion thereof having an axis which extends generally perpendicularly to the plane of the flat portion, the axes of the inlet and outlet openings being offset from each other, and a U-shaped baffle between the pair of walls for preventing direct flow of gases from the inlet opening to the outlet opening, the baffle including a midportion between the inlet and outlet openings and a pair of leg portions which extend away from the midportion, the baffle being provided by an indentation in each of the spaced-apart walls which extends toward the other wall, each of said walls being provided with a plurality or additional indentations which extend toward the other wall for imparting turbulence to gas flowing through the heat exchanger, each of said additional indentations on each wall being positioned adjacent to but offset from an additional indentation on the other wall whereby combustion gases can flow between adjacent additional indentations.

2. The heat exchanger of claim 1 in which the indentations in each of the walls contact each other.

3. The heat exchanger of claim 1 in which the additional indentations on each wall are mirror images of the additional indentations on the other wall.

4. A heat exchanger comprising a pair of spaced-apart generally flat walls which are connected around the peripheries thereof, one of the walls having an inlet opening in the flat portion thereof having an axis which extends generally perpendicularly to the plane of the flat portion and the other wall having an outlet opening in the flat portion thereof having an axis which extends generally perpendicularly to the plane of the flat portion, the axes of the inlet and outlet openings being offset from each other, and a U-shaped baffle between the pair of walls for preventing direct flow of gases from the inlet opening to the outlet opening, the baffle including a midportion between the inlet and outlet openings and a pair of leg portions which extend away from the midportion, the baffle being provided by an indentation in each of the spaced-apart walls which extends toward the other wall, at least one of said walls being provided with a plurality of additional indentatons which extend from said first-mentioned indentation and which extend toward the other wall for imparting turbulence to gas flowing through the heat exchanger.

* * * * *

UNITED STATES PATENT AND TRADEMARK OFFICE
CERTIFICATE OF CORRECTION

PATENT NO. : 4,779,676

DATED : October 25, 1988

INVENTOR(S) : William T. Harrigill

It is certified that error appears in the above-identified patent and that said Letters Patent is hereby corrected as shown below:

```
Col. 6, line 17 change "first" to --flat--.
Col. 6, line 28 change "or" to --of--.
Col. 6, line 58 change "tons" to -- tions --.
```

Signed and Sealed this

Eleventh Day of April, 1989

Attest:

DONALD J. QUIGG

*Attesting Officer*          *Commissioner of Patents and Trademarks*